United States Patent
Hayato et al.

(10) Patent No.: US 9,336,243 B2
(45) Date of Patent: May 10, 2016

(54) IMAGE INFORMATION SEARCH

(71) Applicant: International Business Machines Corporation, Armonk, NY (US)

(72) Inventors: Kiriyama Hayato, Kawasaki (JP); Tomohiro Shioya, Tokyo (JP); Tadashi Tsumura, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 197 days.

(21) Appl. No.: 13/674,558

(22) Filed: Nov. 12, 2012

(65) Prior Publication Data

US 2013/0132414 A1     May 23, 2013

(30) Foreign Application Priority Data

Nov. 17, 2011   (JP) ................................ 2011-251444

(51) Int. Cl.
*G06F 17/30*          (2006.01)

(52) U.S. Cl.
CPC .... *G06F 17/30277* (2013.01); *G06F 17/30265* (2013.01)

(58) Field of Classification Search
CPC .................... G06F 17/30256; G06F 17/30277; G06F 17/30265
USPC ......................................................... 707/758
See application file for complete search history.

(56) References Cited

U.S. PATENT DOCUMENTS

| | | | |
|---|---|---|---|
| 6,807,483 B1* | 10/2004 | Chao et al. ..................... | 701/411 |
| 2009/0083236 A1* | 3/2009 | Shuster .............................. | 707/3 |
| 2009/0171579 A1* | 7/2009 | Wu et al. ........................ | 701/211 |
| 2009/0216435 A1* | 8/2009 | Zheng et al. ................... | 701/209 |
| 2009/0216704 A1* | 8/2009 | Zheng et al. ..................... | 706/52 |
| 2012/0192064 A1* | 7/2012 | Antebi et al. .................. | 715/255 |
| 2012/0276928 A1* | 11/2012 | Shutter .................. | G06Q 30/02 455/456.3 |
| 2012/0296941 A1* | 11/2012 | Cao et al. ...................... | 707/802 |

FOREIGN PATENT DOCUMENTS

| | | |
|---|---|---|
| JP | 2002027313 | 1/2002 |
| JP | 2004220420 | 8/2004 |
| JP | 2006195786 | 7/2006 |
| JP | 2007164718 | 6/2007 |
| JP | 2009176262 | 8/2009 |
| JP | 2010028492 | 2/2010 |
| JP | 2010279638 | 12/2010 |
| JP | 2011028158 | 2/2011 |

* cited by examiner

*Primary Examiner* — Boris Gorney
*Assistant Examiner* — Kris Andersen
(74) *Attorney, Agent, or Firm* — Kunzler Law Group

(57) ABSTRACT

To inform a user that image data including an image of the user or the like is posted on a network, an information providing apparatus includes an acquisition unit for acquiring an action log including a history of a set of a user's positions and dates and times when the user was at the positions. The apparatus further includes a search unit for searching for image data that has been captured at a location and a date and time corresponding to a position of the user and a date and time included in the action log from image data posted on a network. The apparatus also includes a matching unit for detecting image data that includes an image relating to the user from pieces of image data found by the search unit.

15 Claims, 11 Drawing Sheets

IMAGE INFORMATION SEARCH

CROSS-REFERENCE TO RELATED APPLICATIONS

This patent application claims priority to Japanese Patent Application Serial No. 2011-251444 filed on Nov. 17, 2011 for International Business Machines Corporation, the entire contents of which are incorporated herein by reference for all purposes.

BACKGROUND

1. Field

The subject matter disclosed herein relates to an information providing apparatus.

2. Description of the Related Art

There is a risk that one can be captured in an image posted on a network such as the Internet. There is a demand for one to be able to easily search for an image including his/her figure from the images posted on the network.

Patent Literature 1 described a life log apparatus that detects and records movement route information, motion status information or the like on a user and adds information on the degree of importance to the detected information when it is decided that a peculiar situation occurs. Patent Literature 2 describes a person search apparatus that detects a history of actions of a particular person from images captured with a plurality of cameras, which limits the search range in terms of at least one of time and place, searches for the particular person in the limited search range, limits the search range again based on the search result, and repeats the search in the newly limited search range. Patent Literature 3 described a manager system that manages picture image data associated with map data.

CITATION LIST

Patent Literature

Patent Literature 1: JP2010-279638A
Patent Literature 2: JP2007-164718A
Patent Literature 3: JP2009-176262A

BRIEF SUMMARY

Many of images including people posted on networks, however, are taken without their being aware of it. Also, due to the vast quantity of images posted on networks, it is almost impossible to search all of such images. It is consequently very difficult for one to detect the presence of images including him/herself on a network.

According to a first aspect of the present invention, there are provided an information providing apparatus comprising: an acquisition unit for acquiring an action log including a history of a user's positions; a search unit for searching for image data that has been captured at a location corresponding to a position of the user included in the action log from image data posted on a network; and a matching unit for detecting image data that includes an image relating to the user from pieces of image data found by the search unit, a system comprising the information providing apparatus, and a program that makes a computer function as the information providing apparatus.

The summary of the present invention described above does not exhaustively include all the essential features of the present invention. The present invention also includes sub-combinations of the features.

DETAILED DESCRIPTION OF EMBODIMENT

In the following, the present invention will be described with regard to an embodiment. Note that, however, the embodiment described below should not be construed as limiting the scope of the present invention, which is described in the claims. And all the combinations of the features described below with regard to the embodiment are not always essential for implementing the present invention.

Figure 1:
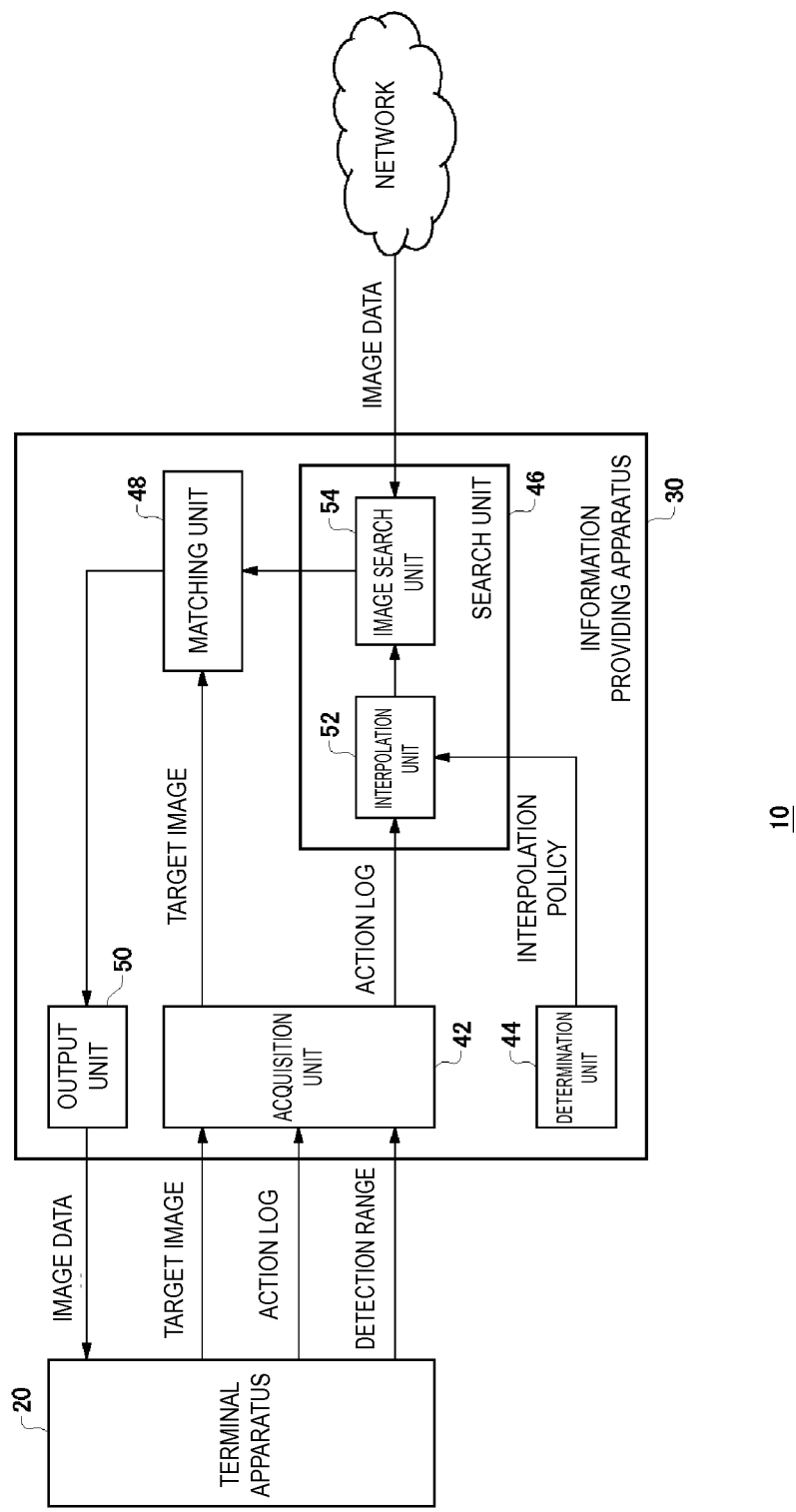
FIG. 1 shows a configuration of an information providing system 10 according to an embodiment.

FIG. 1 shows a configuration of an information providing system 10 according to this embodiment. The information providing system 10 according to this embodiment detects image data including an image relating to a user posted on a network.

The information providing system 10 comprises a terminal apparatus 20 and an information providing apparatus 30. The terminal apparatus 20 is an information terminal held and carried by the user. The terminal apparatus 20 is a cellular phone or a smartphone, for example.

The terminal apparatus 20 detects the position (the latitude, the longitude, the position of a cellular phone base station or the like) of the terminal apparatus 20 using GPS or the like at certain time intervals. The terminal apparatus 20 stores the detected position in an internal memory in correspondence with the date of detection of the position.

The terminal apparatus 20 transmits a detection instruction for image data including an image relating to the user (a target image) to the information providing apparatus 30 in response to a manipulation by the user. When the terminal apparatus 20 transmits the detection instruction, the terminal apparatus 20 also transmits a target image to be searched to the information providing apparatus 30. For example, the target image transmitted from the terminal apparatus 20 to the information providing apparatus 30 may be an image of the face, clothes, a car, a pet or a family member of the user. The terminal apparatus 20 may transmit the target image to the information providing apparatus 30 before transmitting the detection instruction.

The terminal apparatus 20 transmits along with the image detection instruction to the information providing apparatus 30 an action log including a history of a set of the user's positions and the dates on which the user was at the respective positions. The terminal apparatus 20 may transmits the action log to the information providing apparatus 30 before transmitting the detection instruction.

The terminal apparatus 20 transmits a detection range along with the detection instruction to the information providing apparatus 30. For example, the detection range transmitted from the terminal apparatus 20 to the information providing apparatus 30 may be an area range (such as within 10 km from Tokyo station) or a date-and-time range (such as within the 24 hours of Nov. 11, 2011). Alternatively, as the detection range, the terminal apparatus 20 may transmit a detection exemption range to the information providing apparatus 30. For example, the detection exemption range transmitted from the terminal apparatus 20 to the information providing apparatus 30 may be a particular position (such as the position of the user's house) or a particular time zone (such as late night). The terminal apparatus 20 can designate the whole of the range relating to the obtained action log as the detection range.

In addition, for example, the terminal apparatus 20 can transmit information on the user's means of transportation along with the action log to the information providing apparatus 30. For example, the information on the user's means of transportation transmitted along with the action log from the terminal apparatus 20 to the information providing apparatus 30 may be information on foot, a bicycle or an automobile. Alternatively, the terminal apparatus 20 may transmit to the information providing apparatus 30 information used for estimating the means of transportation included in the action log. For example, the information used for estimating the user's means of transportation transmitted from the terminal apparatus 20 to the information providing apparatus 30 may be information on the velocity or acceleration of the user or ambient sound.

The information providing apparatus 30 is a server connected to a network, such as the Internet, for example. The information providing apparatus 30 is accessed by the terminal apparatus 20 over the network or the like.

The information providing apparatus 30 comprises an acquisition unit 42, a determination unit 44, a search unit 46, a matching unit 48 and an output unit 50 as functional blocks for detecting the image data including the image relating to the user. The acquisition unit 42 acquires the detection instruction for the target image from the terminal apparatus 20. The acquisition unit 42 also acquires the target image, the action log and the detection range along with the detection instruction from the terminal apparatus 20. The acquisition unit 42 may acquire the target image and the action log before acquiring the image detection instruction.

The acquisition unit 42 supplies the acquired target image to the matching unit 48. In addition, the acquisition unit 42 extracts part of the acquired action log that is involved with the detection range, and supplies the part of the action log to the search unit 46. If the acquisition unit receives a detection exemption range, the acquisition unit 42 supplies the action log excluding the detection exemption range to the search unit 46.

The determination unit 44 supplies an interpolation policy for interpolation of the action log to the search unit 46. For example, the determination unit 44 supplies an interpolation policy previously set by the user to an interpolation unit 52 in the search unit 46.

The search unit 46 searches image data posted on the network for image data captured at a location corresponding to a position of the user included in the action log. In this way, the search unit 46 can find and acquire, on the network, image data captured in the vicinity of the position by which the user passed.

The search unit 46 includes the interpolation unit 52 and an image search unit 54, for example. The interpolation unit 52 acquires the action log from the acquisition unit 42 and the interpolation policy from the determination unit 44. The interpolation unit 52 interpolates the action log according to the interpolation policy. The interpolation of the action log transforms discrete pieces of positional information and date and time information acquired at certain time intervals into information representing a continuous spatial range having a certain spatial extent and a continuous time range having a certain length of time. The interpolation method will be described in detail later with reference to FIGS. 3 to 7.

The image search unit 54 searches the network for image data captured within the spatial range and the time range indicated by the interpolated action log. The image search unit 54 can search not only for still image data but also for motion picture data.

For example, the image search unit 54 can search the image data posted on the network by extracting a part (such as a header part) of the image data that indicates the position and date and time of capture. Alternatively, the image search unit may transmit a search request to another server to make the server perform a search processing and acquire the search processing result from the server. The image search unit 54 supplies the image data acquired by searching to the matching unit 48.

The matching unit 48 detects whether or not each piece of image data acquired by searching includes the target image. For example, if the target image is an image of the user's face, the matching unit 48 recognizes the pattern of features of the face (such as the positions of the eyes and the contour of the face) included in each piece of image data acquired by searching and compares the recognized pattern of the features of the face against the pattern of the features of the user's face in the target image, thereby detecting whether or not the target image is included in the image data.

For example, if the target image is an image of the license plate of an automobile, the matching unit 48 detects image data including the license plate from among the image data acquired by searching. When the matching unit 48 detects whether or not motion picture data includes the target image, the matching unit 48 detects whether or not the target image is included in the part of the entire motion picture data that is captured in the spatial range and the time range indicated by the interpolated action log.

If the matching unit 48 detects image data including the target image, the output unit 50 transmits the detected image data and the address of the site on the network where the image data has been posted to the terminal apparatus 20. If the matching unit 48 detects no image data including the target image, the output unit 50 transmits information that no image has been detected to the terminal apparatus 20. Once the terminal apparatus 20 receives the image data from the information providing apparatus 30, the terminal apparatus 20 displays the received image data to the user.

Figure 2:
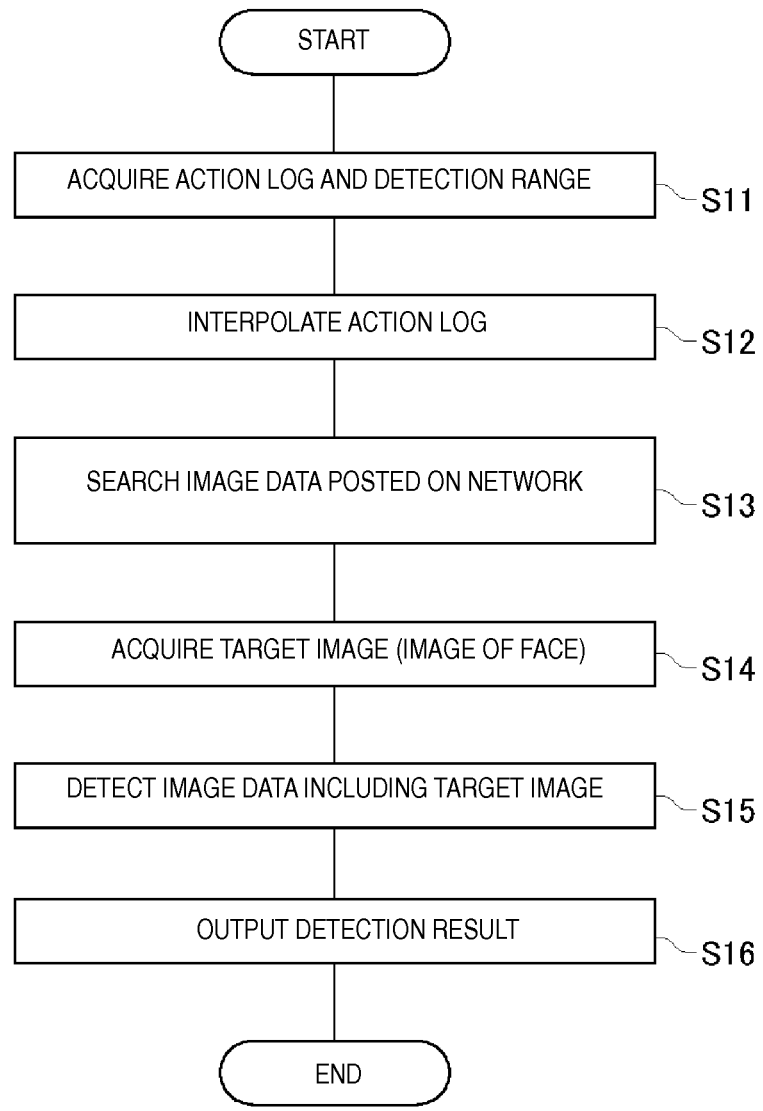
FIG. 2 shows a flow of a process carried out by the information providing apparatus 30 according to this embodiment.

FIG. 2 shows a flow of a process carried out by the information providing apparatus 30 according to this embodiment. In response to a manipulation by the user, the terminal apparatus 20 transmits a detection instruction for the target image posted on the network to the information providing apparatus 30. In this case, the terminal apparatus 20 transmits the action log and the detection range along with the detection instruction to the information providing apparatus 30.

The terminal apparatus 20 can transmit the action log to the information providing apparatus 30 at regular intervals. In this case, the action log has already been transmitted to the information providing apparatus 30 when the terminal apparatus 20 transmits the detection instruction, the terminal apparatus 20 transmits only the detection range along with the detection instruction to the information providing apparatus 30.

Once the information providing apparatus 30 receives the detection instruction from the terminal apparatus 20, the information providing apparatus 30 performs processes in Steps S11 to S16 described below. First, in Step S11, the information providing apparatus 30 acquires the action log and the detection range from the terminal apparatus 20. If the information providing apparatus 30 has previously acquired the action log, the information providing apparatus 30 acquires only the detection range.

Then, in Step S12, the information providing apparatus 30 interpolates the action log according to the interpolation policy. The interpolation method will be described in detail later with reference to FIGS. 3 to 7.

Then, in Step S13, the information providing apparatus 30 searches the image data posted on the network for a particular piece of image data. More specifically, the information providing apparatus 30 searches for image data captured in the spatial range and the time range indicated by the interpolated action log.

Then, in Step S14, the information providing apparatus 30 acquires the target image from the terminal apparatus 20. For example, as the target image, the information providing apparatus 30 acquires an image of the face, clothes, a car, a pet or a family member of the user. The information providing apparatus 30 can acquire the target image before receiving the detection instruction.

Then, in Step S15, the information providing apparatus 30 detects whether or not one or more pieces of image data acquired by searching include image data including the target image. For example, if the target image is an image of the face of the user, the information providing apparatus 30 detects whether or not each of the one or more pieces of image data acquired by searching includes the image of the face of the user.

Then, in Step S16, the information providing apparatus 30 transmits the detection result to the terminal apparatus 20. If image data including the target image is detected, the information providing apparatus 30 transmits, to the terminal apparatus 20, the detected image data and the address of the site on the network where the image data has been posted.

Through the process described above, the information providing system 10 can inform the user that there is image data including an image of the user or the like posted on the network. In addition, if there is image data including an image of the user or the like posted on the network, the information providing system 10 can inform the user of the image data and the address of the site where the image data is posted.

Figure 3:
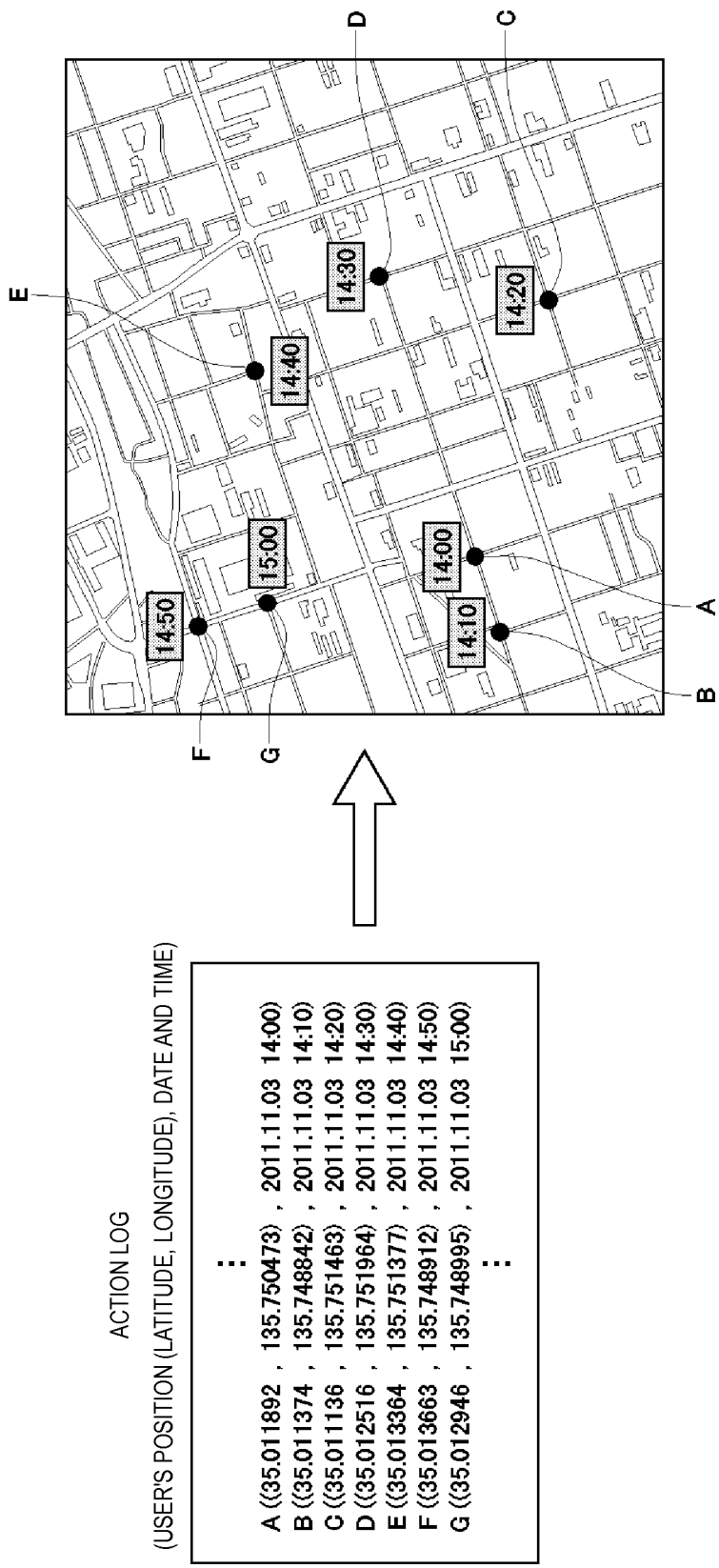
FIG. 3 shows an example of contents of an action log and an example of the action log shown on a map.

FIG. 3 shows an example of contents of the action log and an example of the action log shown on a map. For example, the terminal apparatus 20 detects latitudes and longitudes and the dates and times (time of day, date in year, and year) of acquisition of the latitudes and longitudes acquired using GPS at certain time intervals and stores them as the action log. The example in FIG. 3 shows an action log including the positions of the user (latitudes and longitudes) detected every 10 minutes in a period from 14:00 to 15:00 on Nov. 3, 2011 and a map on which the action log is plotted.

Figure 4:
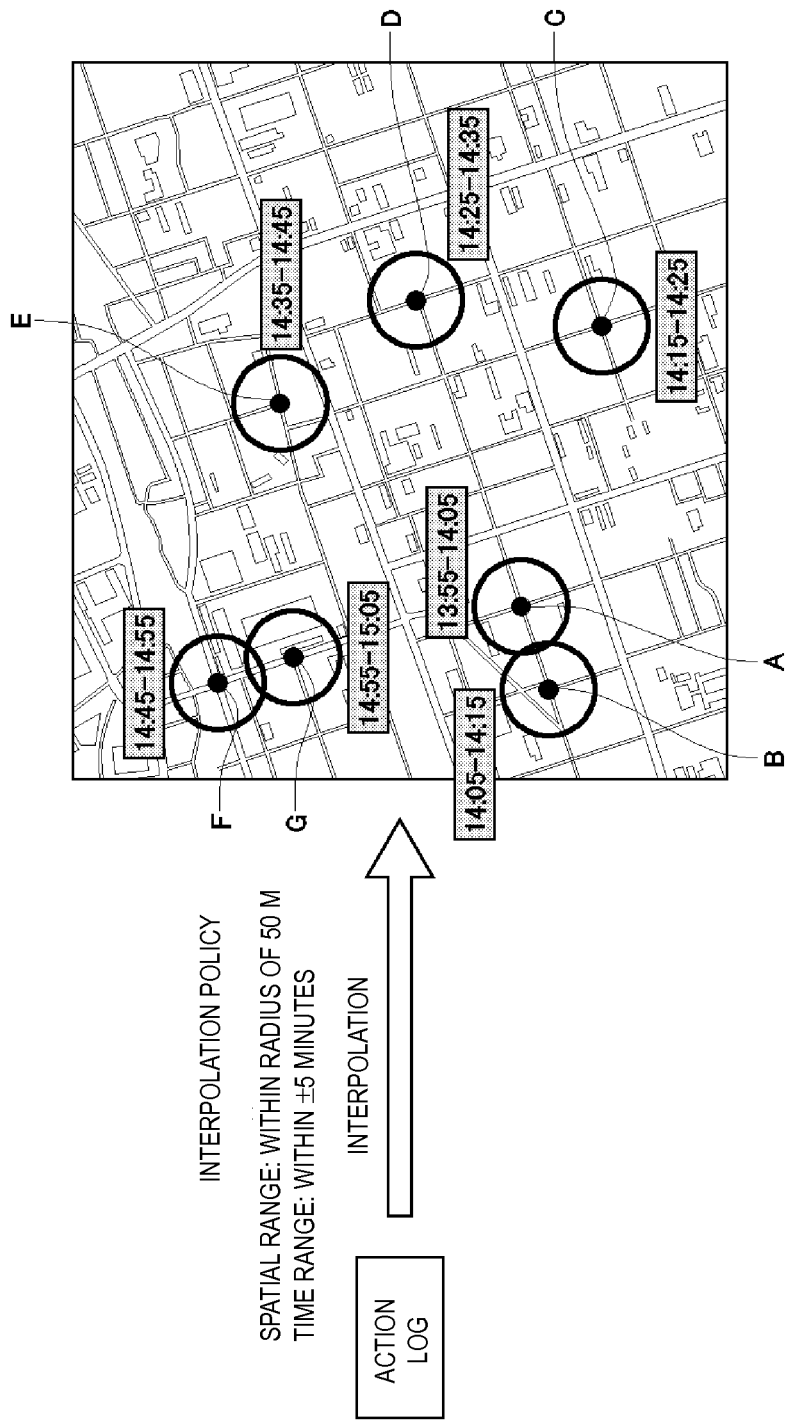
FIG. 4 illustrates an example of interpolation of the action log according to an interpolation policy of a first example.

FIG. 4 illustrates an interpolation of the action log according an interpolation policy of a first example. The interpolation unit 52 in the information providing apparatus 30 interpolates the positions of the user and the dates and times of detection of the positions included in the action log according to the interpolation policy. For example, the interpolation unit 52 interpolates the action log according to such an interpolation policy as to expand each of the positions of the user included in the action log into a spatial range having a certain spatial extent including the position of the user and to expand each of the dates and times included in the action log into a time range having a certain length of time including the date and time. The image search unit 54 searches the image data posted on the network for image data captured in the spatial range and in the time range.

For example, as shown in FIG. 4, the interpolation unit 52 interpolates the action log according to such an interpolation policy as to expand each of the positions of the user into a circular spatial range having a radius of 50 m centered on the position of the user and to expand each of the dates and times into a time range of 10 minutes centered on the date and time. This allows the information providing apparatus 30 to search for image data captured at a position and a date and time that are not included in the original action log.

The interpolation unit 52 can also change the extent of the spatial expansion and the length of the time range according to the time interval at which the position of the user is detected using GPS or the like. For example, the interpolation unit 52 can increase the radius of the circular spatial range and the length of the time range if the user's position is detected at longer time intervals, and decrease the radius of the circular spatial range and the length of the time range if the user's position is detected at shorter time intervals.

Figure 5:
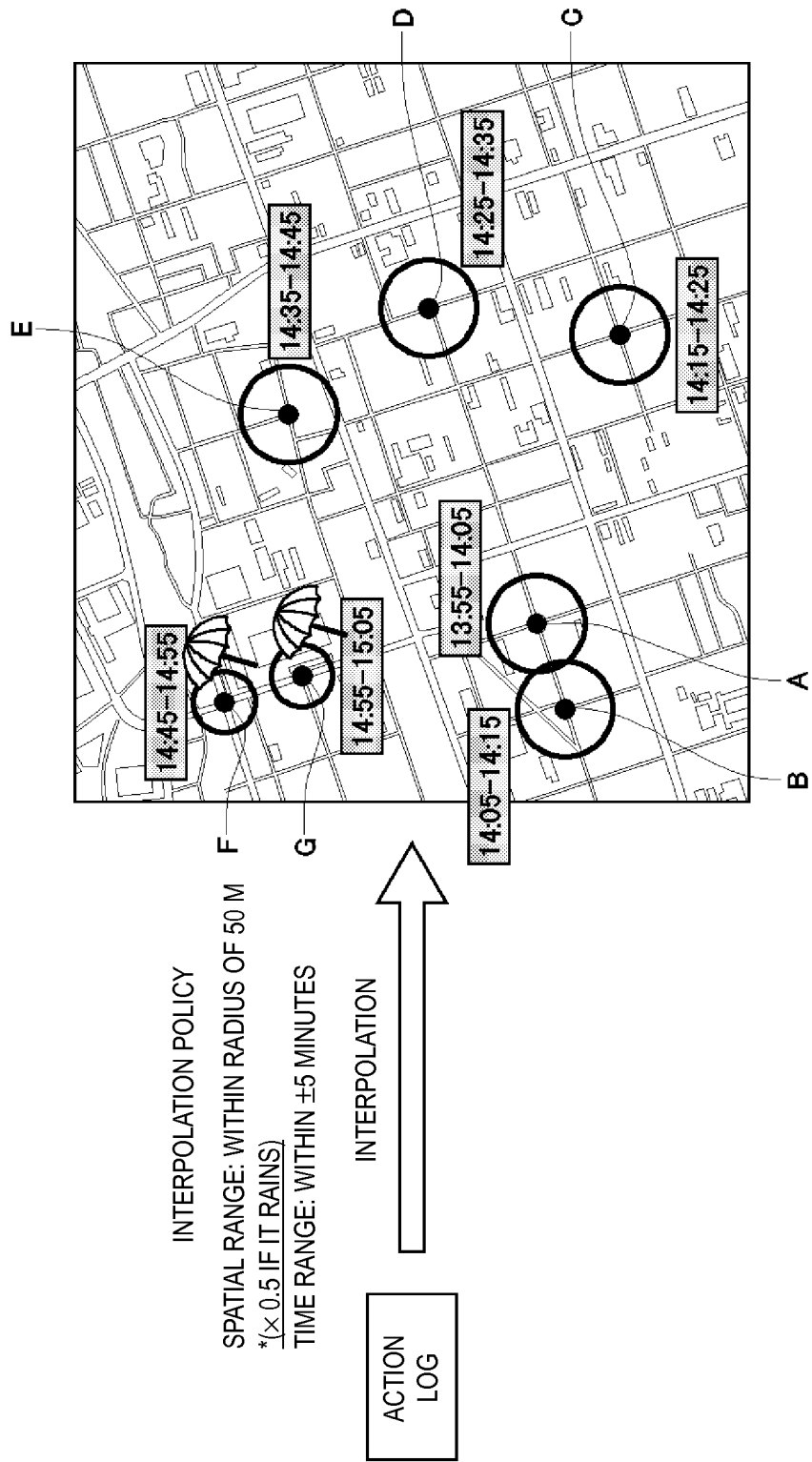
FIG. 5 illustrates an example of interpolation of the action log according to an interpolation policy of a second example.

FIG. 5 illustrates an interpolation of the action log according to an interpolation policy of a second example. For example, the interpolation unit 52 in the information providing apparatus 30 can expand the positions of the user and the dates and times of detection of the positions included in the action log into spatial ranges and time ranges according to such an interpolation policy as to change the degree of expansion according to weather determined from the positions of the user and the dates and times of detection of the positions.

It is supposed that the distance the user travels when it rains is shorter than the distance the user travels when it is fine or cloudy. On this supposition, the interpolation unit 52 interpolates the action log according to such an interpolation policy as to decrease the spatial range when it rains and to increase the spatial range when it does not rain (when it is fine or cloudy, for example).

For example, as shown in FIG. 5, the interpolation unit 52 expands each of the positions of the user included in the action log into a circular spatial range having a radius of 50 m centered on the position of the user when it does not rain, and expands each position of the user into a circular spatial range having a radius of 25 m centered on the position of the user when it rains. This allows the information providing apparatus 30 to more efficiently search the image data on the network by estimating the possible range of presence of the user by taking into consideration the influence of weather.

Figure 6:
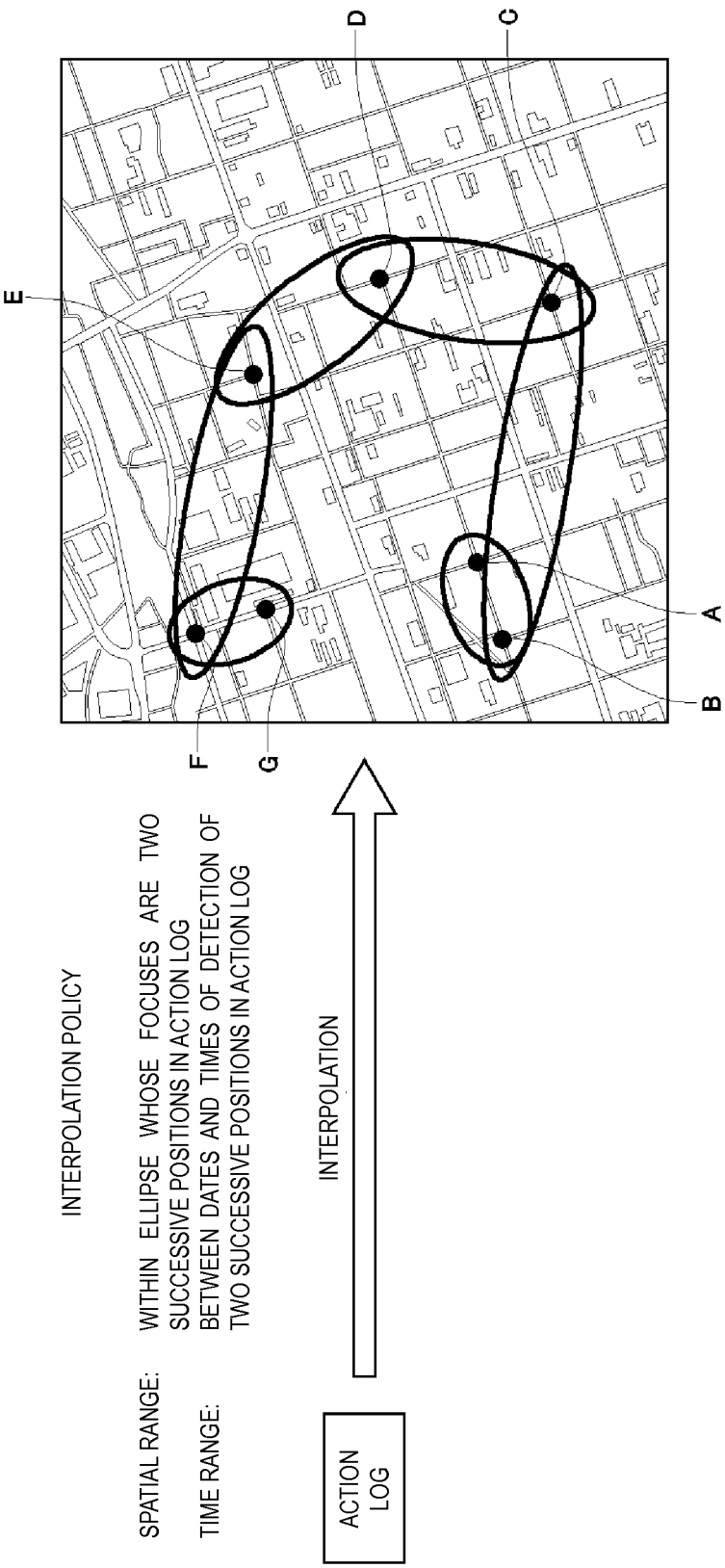
FIG. 6 illustrates an example of interpolation of the action log according to an interpolation policy of a third example.

FIG. 6 illustrates an interpolation of the action log according an interpolation policy of a third example. For example, the interpolation unit 52 in the information providing apparatus 30 can interpolate the action log according to such an interpolation policy as to merge two successive positions of the user included in the action log into an elliptic spatial range whose focuses are the two positions of the user, and to designate the time zone between the dates and times of detection of the two positions of the user as the corresponding time range.

For example, as shown in FIG. 6, if the user moves from a position A to a position B, from the position B to a position C, from the position C to a position D and so on, the interpolation unit 52 expands the positions of the user included in the action log into an elliptic spatial range whose focuses are the positions A and B, an elliptic spatial range whose focuses are the positions B and C, and an elliptic spatial range whose focuses are the positions C and D, and so on. This allows the information providing apparatus 30 to search on the network for image data captured in a range including a possible travel path of the user.

Figure 7:
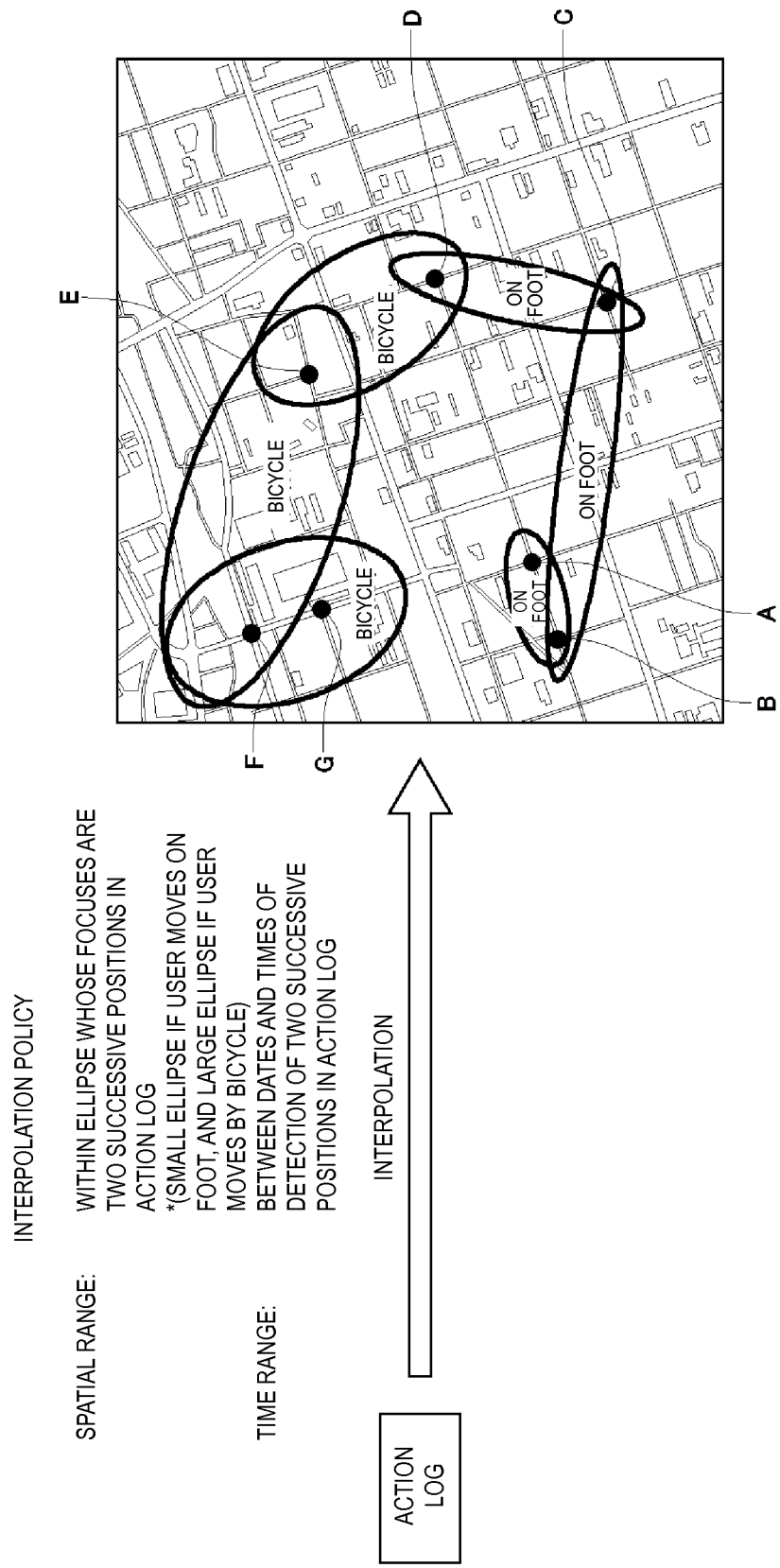
FIG. 7 illustrates an example of interpolation of the action log according to an interpolation policy of a fourth example.

FIG. 7 illustrates an interpolation of the action log according an interpolation policy of a fourth example. The interpolation unit 52 in the information providing apparatus 30 can expand the positions of the user included in the action log and the dates and times of detection of the positions into spatial ranges and time ranges according to such an interpolation policy as to change the degree of expansion according to the user's means of transportation.

For example, the range of movement of the user in a certain length of time is wider when the user moves by bicycle than when the user moves on foot. Therefore, the interpolation unit 52 interpolates the action log according to such an interpolation policy as to decrease the spatial range when the user moves on foot and increase the spatial range when the user moves by bicycle.

For example, as shown in FIG. 7, in the case where the spatial ranges are ellipses whose focuses are two successive positions of the user, the spatial ranges are ellipses with shorter longitudinal and lateral diameters when the user moves on foot, and the spatial ranges are ellipses with longer longitudinal and lateral diameters when the user moves by bicycle. This allows the interpolation unit 52 to more accurately estimate the possible range of presence of the user.

If the user moves by automobile, the user is in the automobile, so that the user is less likely to be captured from outside. Therefore, the interpolation unit 52 can interpolate the action log according to such an interpolation policy as to decrease the spatial range when the user moves by automobile.

If the user moves by public transportation such as a bus and a train, the user is less likely to be captured at locations out of the route. Therefore, the interpolation unit 52 can also interpolate the action log according to such an interpolation policy as to decrease the spatial range when the user moves by public transportation.

The terminal apparatus 20 may allow the user himself/herself to input the means of transportation. For example, the terminal apparatus 20 transmits the action log including the means of transportation input by the user to the information providing apparatus 30. This allows the determination unit 44 in the information providing apparatus 30 to acquire the user's means of transportation from the terminal apparatus 20 of the user.

The terminal apparatus 20 may detect the velocity of the user (that is, the velocity of the terminal apparatus 20) with a velocity sensor and transmit the action log including the velocity of the user to the information providing apparatus 30. In this case, the determination unit 44 in the information providing apparatus 30 can determine the user's means of transportation from the velocity of the user.

The terminal apparatus 20 may detect the acceleration of the user (that is, the acceleration of the terminal apparatus 20) with an acceleration sensor and transmit the action log including the acceleration of the user to the information providing apparatus 30. In this case, the determination unit 44 in the information providing apparatus 30 can determine the user's means of transportation from the acceleration of the user.

The terminal apparatus 20 may detect the ambient sound around the user and transmit the action log including audio data including the detected sound to the information providing apparatus 30. In this case, the determination unit 44 in the information providing apparatus 30 can analyze the audio data and determine the user's means of transportation by estimating the environment around the user. For example, if the ambient sound includes certain noise, the determination unit 44 decides that the user is in a train and that the user's means of transportation is a train.

As described above, the information providing apparatus 30 can determine the user's means of transportation from a detection result obtained with a sensor provided in the terminal apparatus 20.

Figure 8:
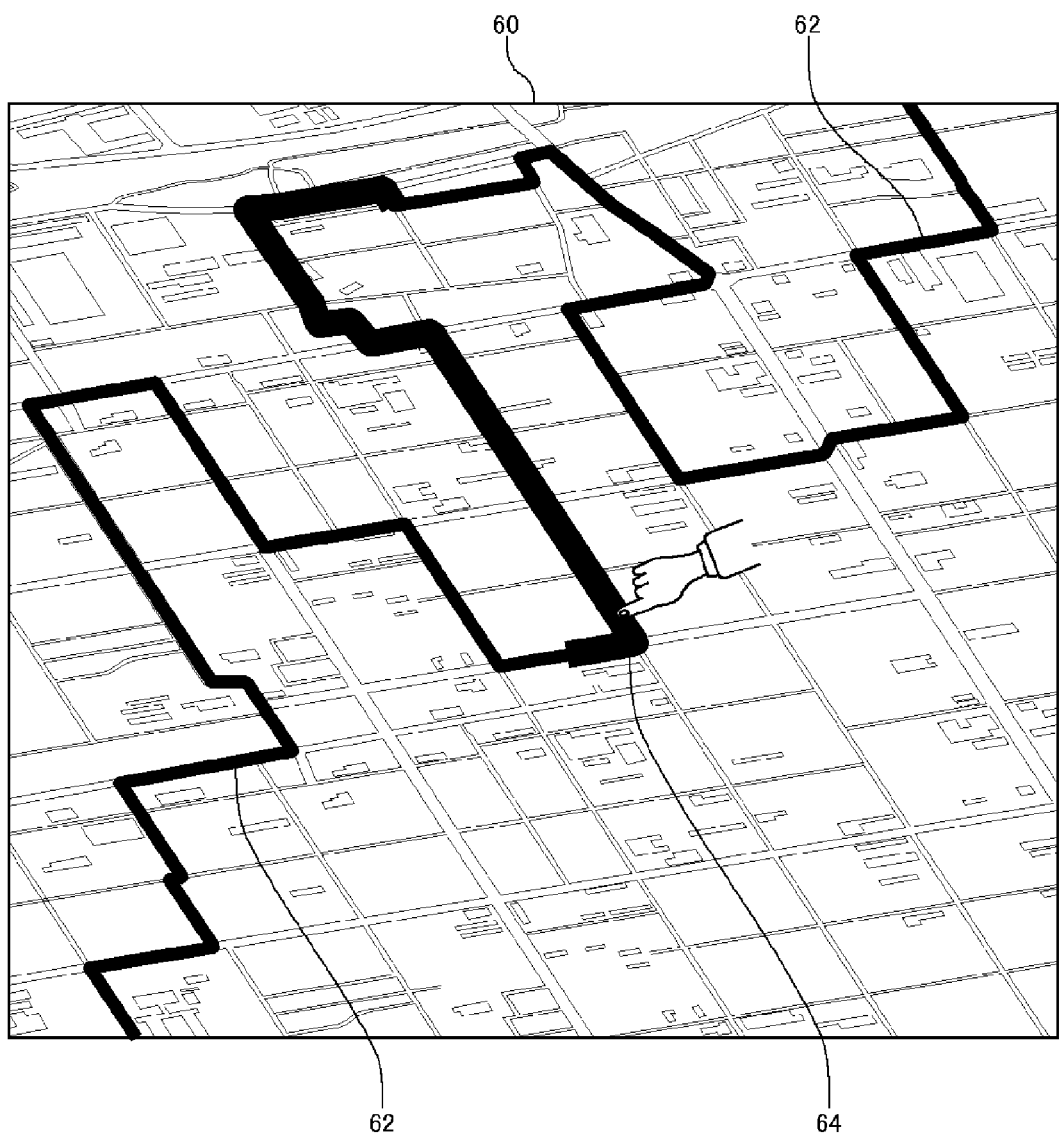
FIG. 8 shows an example of an input detection range.
Figure 9:
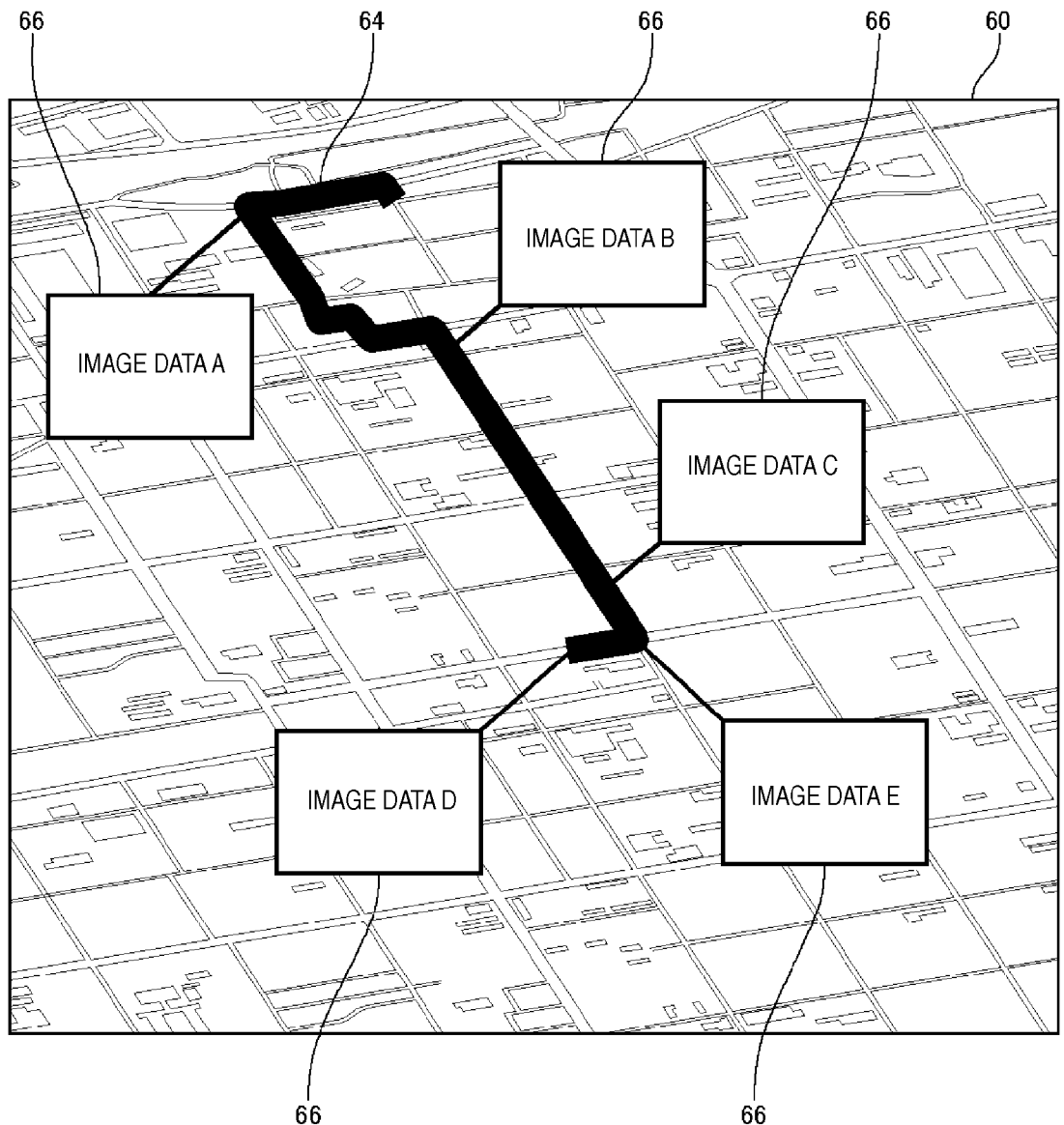
FIG. 9 shows an example of display of detected image data.

FIG. 8 illustrates an example of an input detection range. FIG. 9 illustrates an example of display of detected image data. When the terminal apparatus 20 transmits the detection instruction for the target image to the information providing apparatus 30, the terminal apparatus 20 transmits the detection range along with the detection instruction to the information providing apparatus 30.

In this case, the terminal apparatus 20 can display a map on a screen and transmit a range including a route drawn on the map by the user to the information providing apparatus 30 as the detection range. For example, as shown in FIG. 8, the terminal apparatus 20 displays on a map image 60 a route 62 shown by a line interconnecting the positions of the user included in the action log. The terminal apparatus 20 transmits a section of the route 62 touched by the user as a detection range 64 to the information providing apparatus 30. This allows the information providing apparatus 30 to search for image data captured at locations corresponding to the positions of the user in the detection range 64 of the positions of the user included in the action log.

If the information providing apparatus 30 detects image data including the target image as a result of the detection processing, the terminal apparatus 20 displays the image data detected by the information providing apparatus 30 at the corresponding position on the map. For example, as shown in FIG. 9, the terminal apparatus 20 displays a thumbnail image 66 represented by the detected image data at the corresponding position in the detection range 64. In this way, the terminal apparatus 20 can allow the user to visually recognize where the image data including the target image was captured.

Figure 10:
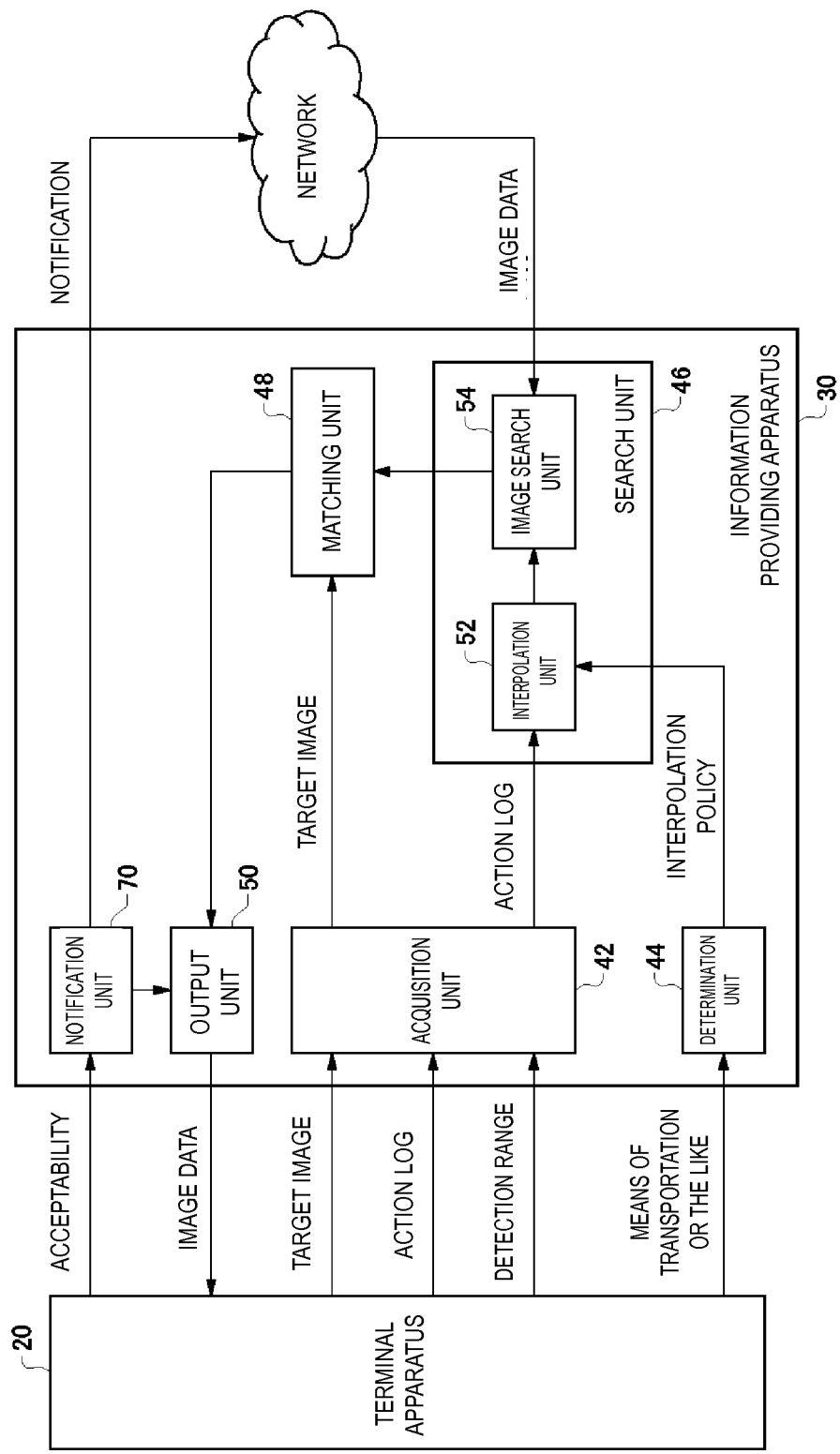
FIG. 10 shows a configuration of an information providing system according to a modification of this embodiment.

FIG. 10 shows a configuration of an information providing system 10 according to a modification of this embodiment. The information providing system 10 according to this modification comprises basically the same components as those shown in FIG. 1, which are denoted by the same reference signs, and has basically the same configuration and functionality as the information providing system shown in FIG. 1, so that the information providing system 10 according to this modification will not be described except for the following differences from the information providing system shown in FIG. 1.

The information providing system 10 according to this modification further comprises a notification unit 70. According to this modification, if the information providing apparatus 30 detects image data including the target image, the terminal apparatus 20 displays the detected image data and allows the user to input the acceptability for the detected image data. The "acceptability" used herein means the degree of acceptability of the image data being posted on the network. For example, the acceptability is a value that indicates whether or not the user can accept that the image data is posted on the network.

The notification unit 70 acquires the acceptability input by the user from the terminal apparatus 20 for each piece of detected image data. If there is image data the user cannot accept being posted on the network, the notification unit 70 notifies, by e-mail or the like, the one who has posted the image data and the administrator or the like of the network and the site on which the image data is posted to delete the image data from the network. In this way, when image data including the target image, such as an image of the face of the user, is posted on the network, the information providing apparatus 30 can delete the image data from the network.

Besides, the notification unit 70 notifies the output unit 50 of image data that is accepted being posted on the network. If the same image data is detected when the subsequent detection instructions are transmitted to the information providing apparatus 30 from the terminal apparatus 20, the output unit 50 stops transmission of the image data to the terminal apparatus 20 or notifies that the acceptability for the image data was set in the past. In this way, the information providing apparatus 30 can avoid requiring the user to input the acceptability for the same image data again.

Figure 11:
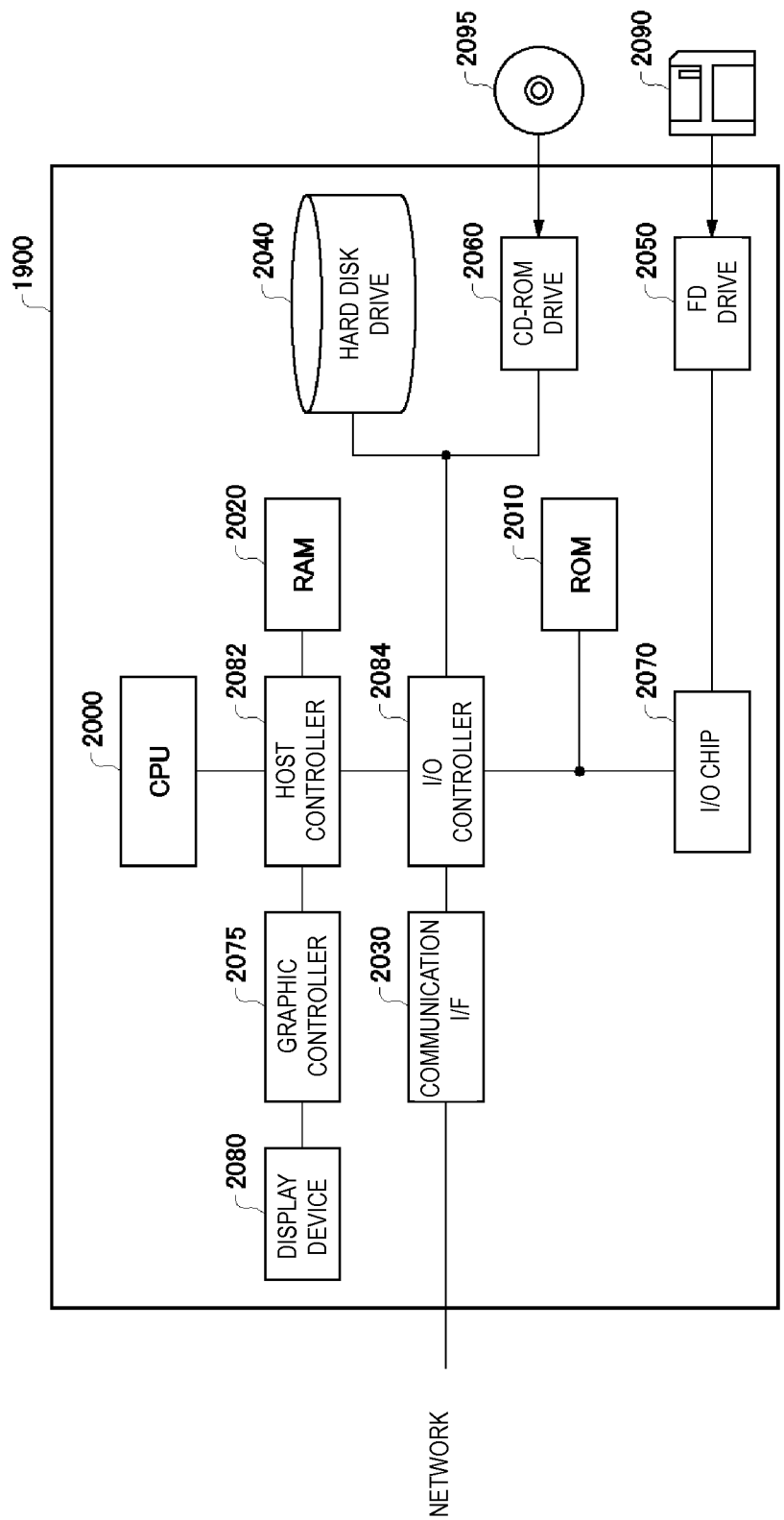
FIG. 11 shows an example of a hardware configuration of a computer according to this embodiment.

FIG. 11 shows an example of a hardware configuration of a computer 1900 according to this embodiment. The computer 1900 according to this embodiment comprises a CPU peripheral unit including a CPU 2000, a RAM 2020, a graphic controller 2075 and a display device 2080 interconnected by a host controller 2082, an input/output unit including an communication interface 2030, a hard disk drive 2040 and a CD-ROM drive 2060 connected to the host controller 2082 via an input/output controller 2084, and a legacy input/output unit including a ROM 2010, a flexible disk drive 2050 and an input/output chip 2070 connected to the input/output controller 2084.

The host controller 2082 connects the RAM 2020 to the CPU 2000 and the graphic controller 2075 that access the RAM 2020 at high transfer rate. The CPU 2000 operates on a program stored in the ROM 2010 and the RAM 2020 to control each component. The graphic controller 2075 acquires image data generated on a frame buffer in the RAM 2020 by the CPU 2000 or the like and makes the display device 2080 display the image data. Alternatively, the graphic controller 2075 may include a frame buffer that stores image data generated by the CPU 2000 or the like.

The input/output controller 2084 connects the host controller 2082 to the communication interface 2030 that is a relatively high speed input/output device, the hard disk drive 2040 and the CD-ROM drive 2060. The communication interface 2030 communicates another apparatus over a network. The hard disk drive 2040 stores a program and data used by the CPU 2000 in the computer 1900. The CD-ROM drive 2060 reads a program or data from a CD-ROM 2095 and provides the program or data to the hard disk drive 2040 via the RAM 2020.

To the input/output controller 2084, the ROM 2010, the flexible disk drive 2050 and a relatively low speed input/output device of the input/output chip 2070 are connected. The ROM 2010 stores a boot program executed by the computer 1900 for activation and/or a program or the like that depends on the hardware of the computer 1900. The flexible disk drive 2050 reads a program or data from a flexible disk 2090 and provides the program or data to the hard disk drive 2040 via the RAM 2020. The input/output chip 2070 connect the flexible disk drive 2050 to the input/output controller 2084 and connects various input/output devices to the input/output controller 2084 via a parallel port, a serial port, a keyboard port, a mouse port or the like.

The program provided to the hard disk drive 2040 via the RAM 2020 is stored in a recording medium, such as the flexible disk 2090, the CD-ROM 2095 or an IC card, and provided by the user. The program is read from the recording medium, installed into the hard disk drive 2040 in the computer 1900 via the RAM 2020 and executed by the CPU 2000.

A program that is installed into the computer 1900 to make the computer 1900 function as the information providing apparatus 30 comprises an acquisition module, a determination module, a search module, a matching module and an output module. The program or modules act on the CPU 2000 or the like to make the computer 1900 function as the acquisition unit 42, the determination unit 44, the search unit 46, the matching unit 48 and the output unit 50.

When an information processing described in the program is loaded to the computer 1900, the information processing functions as the acquisition unit 42, the determination unit 44, the search unit 46, the matching unit 48 or the output unit 50, which are specific means implemented by cooperation of software and the various hardware resources described above. These specific means implement calculation or processing of information appropriate for a particular use of the computer 1900 according to this embodiment, thereby constituting the information providing apparatus 30 appropriate for the particular use.

For example, when the computer 1900 is to communicate with an external apparatus or the like, the CPU 2000 executes a communication program loaded onto the RAM 2020 and instructs the communication interface 2030 to perform a communication processing according to the specific processing described in the communication program. Under the CPU 2000, the communication interface 2030 reads transmission data stored in a transmission buffer region or the like on the storage device such as the RAM 2020, the hard disk drive 2040, the flexible disk 2090 or the CD-ROM 2095 and transmits the transmission data to the network, or writes reception data received from the network to a reception buffer region or the like on the storage device. The communication interface 2030 can exchange transmission/reception data with the storage device by direct memory access (DMA) in this way. Alternatively, however, the CPU 2000 may transfer transmission/reception data by reading data from a source storage device or communication interface 2030 and writing the data to a destination communication interface 2030 or storage device.

In addition, the CPU 2000 performs various processes on the data in the RAM 2020 by loading to the RAM 2020 by DMA transfer or the like the whole or a required part of the file, database or the like stored in the external storage device, such as the hard disk drive 2040, the CD-ROM drive 2060 (CD-ROM 2095), the flexible disk drive 2050 (flexible disk 2090). The CPU 2000 writes the processed data back to the external storage device by DMA transfer or the like. In such a process, the RAM 2020 can be regarded as temporarily retaining the contents of the external storage device, so that the RAM 2020 and the external storage device or the like are collectively referred to as a memory, a storage unit, a storage device or the like in this embodiment. Various types of information, such as various types of programs, data, tables and databases, in this embodiment are stored in such a storage device for information processing. The CPU 2000 can also retain a part of the RAM 2020 in a cache memory and read/write data from/to the cache memory. In such a case, the cache memory serves a part of the function of the RAM 2020, so that the cache memory is also included in the RAM 2020, the memory and/or the storage device unless otherwise specified in this embodiment.

The CPU 2000 performs various types of processes specified by an instruction sequence in a program, including various types of calculations, information processes, conditional decisions and information search and replacement described in this embodiment, on the data read from the RAM 2020 and writes the processed data back to the RAM 2020. For example, when the CPU 2000 performs a conditional decision, the CPU 2000 decides whether or not various types of variables shown in this embodiment meet conditions that they are larger than, smaller than, equal to or larger than, equal to or smaller than, or equal to another variable or a constant, and branches to a different instruction sequence or invokes a sub-routine if the conditions are met (or not met).

The CPU 2000 can also search for information stored in a file or database in the storage device. For example, if the storage device stores a plurality of entries whose first attribute values are associated with second attribute values, the CPU 2000 can search the entries stored in the storage device for an entry whose first attribute value meets a specified predetermined condition and read the second attribute value stored in the entry, thereby obtaining the second attribute value associated with the first attribute that meets the predetermined condition.

The program or modules described above may be stored in an external recording medium. The recording medium is not limited to the flexible disk 2090 or the CD-ROM 2095 but may be an optical recording medium such as a DVD and a CD, a magneto-optical recording medium such as an MO, a tape medium, or a semiconductor memory such as an IC card. Alternatively, a storage device such as a hard disk or a RAM provided in a server system connected to a dedicated communication network or the Internet may be used as a recording medium, and a program may be provided to the computer 1900 via the network.

While the present invention has been described with regard to an embodiment thereof, the technical scope of the present invention is not limited to the scope of the embodiment described above. As will be apparent to those skilled in the art, many various modifications and alterations can be made to the embodiment described above. It is apparent from the claims that the technical scope of the present invention can include such modifications and alterations.

Note that the operations, procedures, steps, stages and other processes of the apparatuses, systems, programs and methods described or shown in the claims, specification and drawings can occur in any order unless a particular order is explicitly specified by a word or phrase such as "before" and "in advance", or the result of a processing is used for a subsequent processing. Even if a word such as "first" and "next" is used in the description of the flow of an operation described or shown in the claims, specification or drawings for the sake of convenience, the word does not mean that the operation always occurs in that order. Table 1 provides a Reference Signs List.

TABLE 1

| Number | Reference Sign |
|---|---|
| 10 | information providing system |
| 20 | terminal apparatus |
| 30 | information providing apparatus |
| 42 | acquisition unit |
| 44 | determination unit |

TABLE 1-continued

| Number | Reference Sign |
|---|---|
| 46 | search unit |
| 48 | matching unit |
| 50 | output unit |
| 52 | interpolation unit |
| 54 | image search unit |
| 60 | map image |
| 62 | route |
| 64 | detection range |
| 66 | thumbnail image |
| 70 | notification unit |
| 1900 | computer |
| 2000 | CPU |
| 2010 | ROM |
| 2020 | RAM |
| 2030 | communication interface |
| 2040 | hard disk drive |
| 2050 | flexible disk drive |
| 2060 | CD-ROM drive |
| 2070 | input/output chip |
| 2075 | graphic controller |
| 2080 | display device |
| 2082 | host controller |
| 2084 | input/output controller |
| 2090 | flexible disk |
| 2095 | CD-ROM |

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An information providing apparatus comprising:
   a processor;
   a computer readable storage medium storing computer readable program code executable by the processor to:
   acquire an action log comprising a history of a set of user positions and dates and times when a user was at the user was at the user positions;
   expand the user positions and times in the action log into circular spatial ranges with a first radius when it does not rain and a smaller radius when it rains and merge the circular spatial ranges into elliptic spatial ranges;
   acquire a user means of transportation between the user positions from a terminal apparatus;
   modify the elliptic spatial ranges based on the user means of transportation, wherein the elliptic spatial ranges have a first longitudinal diameter and a first lateral diameter when the user moves on foot, a second longitudinal diameter and a second lateral diameter when the user moves by bicycle, a third longitudinal diameter and a third lateral diameter when the user is in an automobile, and a fourth longitudinal diameter and a fourth lateral diameter when the user moves by public transportation;
   search for image data that has been captured at a location and time within the elliptic spatial ranges and a time range corresponding to a position and time of the user in the action log from network image data posted on a network; and
   detect image data that comprises an image relating to the user from pieces of image data found by the search.

2. The information providing apparatus according to claim 1, wherein the processor expands the user positions and the dates and time in the action log into the elliptic spatial ranges and the time range, respectively, according to a preset interpolation policy and searches for image data that has been captured in the elliptic spatial ranges and in the time range.

3. The information providing apparatus according to claim 2, wherein the processor expands the user positions and the dates and times included in the action log into the elliptic spatial ranges and the time range, respectively, according to the interpolation policy to change a degree of expansion according to the weather between the user positions and the dates and times.

4. The information providing apparatus according to claim 1, wherein the processor acquires a velocity of the user from a terminal apparatus, and estimates the user means of transportation based on the velocity.

5. The information providing apparatus according to claim 4, wherein the processor acquires an acceleration of the user from the terminal apparatus and estimates the user means of transportation based on the acceleration.

6. The information providing apparatus according to claim 5, wherein the processor acquires audio data representing an ambient sound around the user and determines the user means of transportation based on the audio data.

7. The information providing apparatus according to claim 6, wherein the processor searches the network image data by extracting a data part representing the location and the date and time.

8. The information providing apparatus according to claim 7, wherein the processor acquires an image data detection exemption range from the user and does not search for image data that has been captured within the detection exemption range.

9. The information providing apparatus according to claim 1, wherein the processor detects whether each piece of image data includes an image of the face of the user.

10. The information providing apparatus according to claim 1, wherein when the processor searches motion picture data and detects whether an image relating to the user is in a time range corresponding to a date and time of the motion picture data.

11. A method for image information search comprising:
    acquiring, by use of a processor, an action log comprising a history of a set of user positions and dates and times when a user was at the user positions;
    expanding the user positions and times in the action log into circular spatial ranges with a first radius when it does not rain and a smaller radius when it rains and merges the circular spatial ranges into elliptic spatial ranges;
    acquiring a user means of transportation between the user positions from a terminal apparatus;
    modifying the elliptic spatial ranges based on the user means of transportation, wherein the elliptic spatial ranges have a first longitudinal diameter and a first lateral diameter when the user moves on foot, a second longitudinal diameter and a second lateral diameter when the user moves by bicycle, a third longitudinal diameter and a third lateral diameter when the user is in an automobile, and a fourth longitudinal diameter and a fourth lateral diameter when the user moves by public transportation;
    searching for image data that has been captured at a location and time within the elliptic spatial ranges and a time range corresponding to a position and time of the user in the action log from network image data posted on a network; and
    detecting image data that comprises an image relating to the user from pieces of image data found by the search.

12. The method according to claim 11, the method further comprising expanding the user positions and the dates and times in the action log into the elliptic spatial ranges and the time range, respectively, according to a preset interpolation policy and searching for image data that has been captured in the elliptic spatial ranges and in the time range.

13. The method according to claim 12, the method further comprising expanding the user positions and the dates and time included in the action log into the elliptic spatial ranges and the time range, respectively, according to the interpolation policy to change a degree of expansion according to the weather between the user positions and the dates and times.

14. A computer program product for image information search, the computer program product comprising a non-transitory computer readable storage medium having program code embodied therein, the program code readable/executable by a processor to:
    acquire an action log comprising a history of a set of user positions and dates and times when a user was at the user positions;
    expand the user positions and times in the action log into circular spatial ranges with a first radius when it does not rain and a smaller radius when it rains and merge the circular spatial ranges into elliptic spatial ranges;
    acquire a user means of transportation between the user positions from a terminal apparatus;
    modify the elliptic spatial ranges based on the user means of transportation, wherein the elliptic spatial ranges have a first longitudinal diameter and a first lateral diameter when the user moves on foot, a second longitudinal diameter and a second lateral diameter when the user moves by bicycle, a third longitudinal diameter and a third lateral diameter when the user is in an automobile, and a fourth longitudinal diameter and a fourth lateral diameter when the user moves by public transportation;
    search for image data that has been captured at a location and time within the elliptic spatial ranges and a time range corresponding to a position and time of the user in the action log from network image data posted on a network; and
    detect image data that comprises an image relating to the user from pieces of image data found by the search.

15. A system comprising:
    a non-transitory computer readable storage medium storing computer readable program code executable by a processor, the computer readable program code comprising:
    code that acquires an action log comprising a history of a set of user positions and dates and times when the user was at the user positions;
    code that expands the user positions and times in the action log into circular spatial ranges with a first radius when it does not rain and a smaller radius when it rains and merges the circular spatial ranges into elliptic spatial ranges;
    code that acquires a user means of transportation between the user positions from a terminal apparatus;
    code that modifies the elliptic spatial ranges based on the user means of transportation, wherein the elliptic spatial ranges have a first longitudinal diameter and a first lateral diameter when the user moves on foot, a second longitudinal diameter and a second lateral diameter when the user moves by bicycle, a third longitudinal diameter and a third lateral diameter when the user is in an automobile, and a fourth longitudinal diameter and a fourth lateral diameter when the user moves by public transportation;

code that searches for image data that has been captured at a location and time within the elliptic spatial ranges and a time range corresponding to a position and time of the user in the action log from network image data posted on a network;
code that detects image data that comprises an image relating to the user from pieces of image data found by the search; and
a terminal apparatus connected to an information providing apparatus via the network.

* * * * *